United States Patent [19]

Clark

[11] Patent Number: 5,212,346

[45] Date of Patent: May 18, 1993

[54] ELECTRICAL JUNCTION BOX

[75] Inventor: Wendell Clark, Semmes, Ala.

[73] Assignee: Melvin Pierce, Semmes, Ala. ; a part interest

[21] Appl. No.: 723,462

[22] Filed: Jun. 28, 1991

[51] Int. Cl.$^5$ .............................................. H01R 9/24
[52] U.S. Cl. .................................................. 174/59
[58] Field of Search ...................................... 174/59, 60

[56] References Cited

U.S. PATENT DOCUMENTS

| | | | |
|---|---|---|---|
| 2,463,033 | 3/1949 | Harnett | 174/59 X |
| 2,463,034 | 3/1949 | Harnett | 174/59 X |
| 2,574,608 | 11/1951 | Ziph | 174/59 X |
| 2,699,533 | 1/1955 | Harnett | 174/59 X |
| 2,831,914 | 4/1958 | Jacobs | 174/59 |

Primary Examiner—Leo P. Picard
Assistant Examiner—David Tone
Attorney, Agent, or Firm—James B. Middleton

[57] ABSTRACT

An electrical junction box is generally cylindrical, and has terminals on the peripheral surface. The box is divided into a plurality of layers, each layer being one polarity, so polarized wires can be easily plugged into the appropriate terminals. A cover may be used over the box if desired, the cover being fixable to the box. Also, the cables to be connected in the box may be fixed with respect to the box. Each terminal has a release slot adjacent to it so wires can be removed as desired. Each layer has a connector that electrically connects all terminals in that layer.

8 Claims, 1 Drawing Sheet

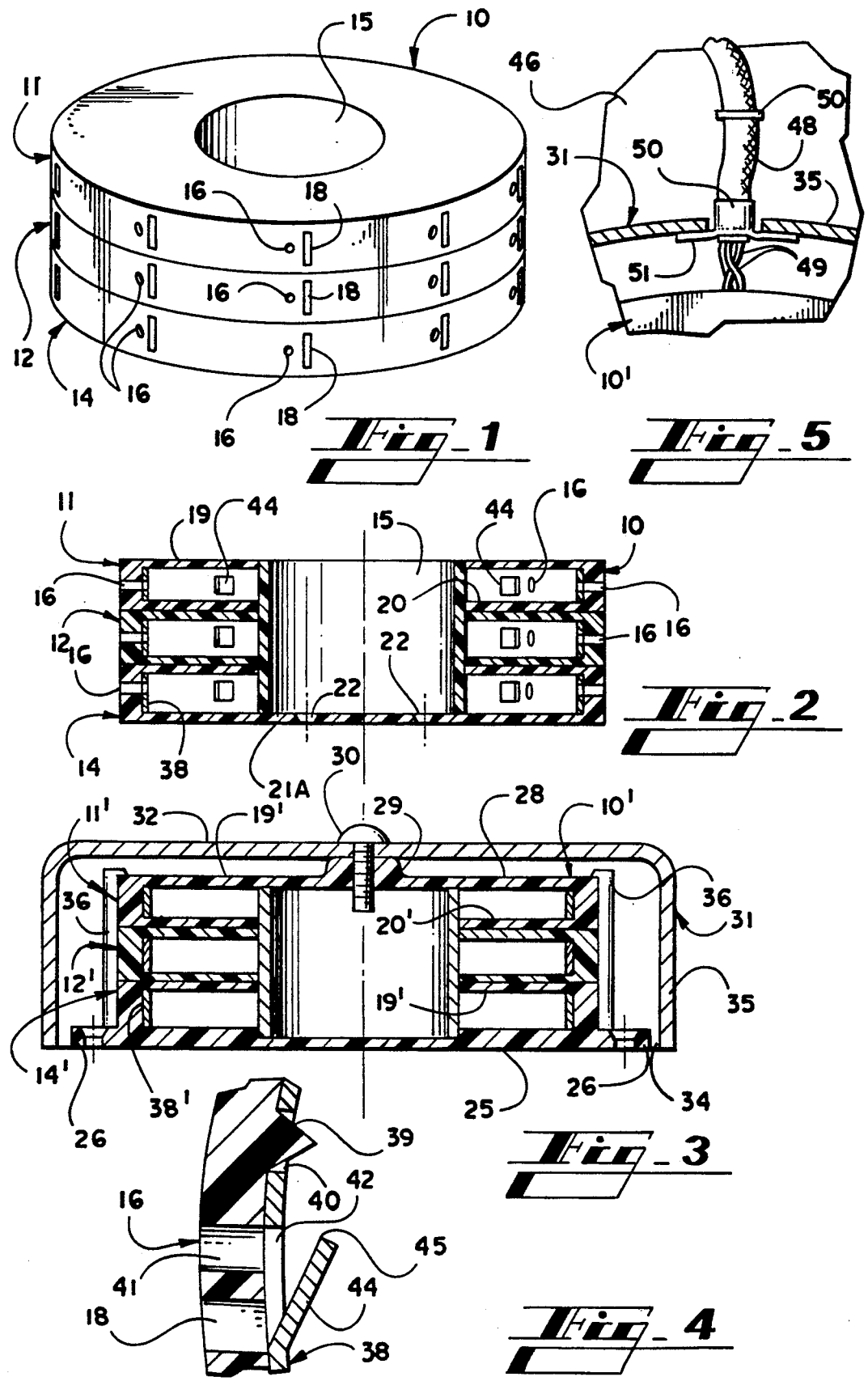

ELECTRICAL JUNCTION BOX

INFORMATION DISCLOSURE STATEMENT

For many years electrical junction boxes have comprised a generally open box having a removable cover. Openings into the box are adapted to receive the ends of multi-conductor cables therethrough, usually with a clamp that is fixable to the box. While such boxes have varied somewhat in size and shape, the basic box, and use of the box, have not changed.

Conventional junction boxes are generally effective, but there are several problems with these prior art boxes. Those skilled in the art will understand that, when a cable terminates in a box, the wires of the cable must be attached to other wires of other cables that also terminate in the same box. It will therefore be recognized that a box quickly becomes filled with wires so that the plurality of wires must be forced into the box in order to place a cover on the box. Furthermore, there are necessarily a plurality of wire connections within the box, these connections being frequently made with wire nuts or the like. Wire nuts are rather bulky, and are subject to loosening if the wires are manipulated very much. Thus, the bending of the many wires to force the wires into a junction box may both crowd the wires and cause loosening of wire connections. If one or more wire nuts fall off the wires, direct short circuits are possible, either between wires, or between hot wires and a grounded box.

The prior art solution to the above discussed problems includes the making of rules to limit the number of cables that can terminate in one junction box. Such a rule will limit the crowding of wires in one junction box; but, it requires the installation of multiple boxes, and sometimes causes difficulties in required interconnections. There are numerous terminal block arrangements for low-voltage connections, but the prior art terminal blocks are not suitable for the heavy wires and relatively high voltages required in wiring ordinary buildings, whether domestic or industrial.

Thus, the prior art does not provide a reasonable solution to the above discussed problems with junction boxes for circuits used for electrical power.

SUMMARY OF THE INVENTION

This invention relates generally to wire interconnection means, and is more particularly concerned with an electrical junction box having wire connectors provided therein.

The present invention provides an electrical junction box for terminating and interconnecting a plurality of electrical cables. The junction box includes a plurality of sections, each section having a plurality of terminals for receiving and holding wires. Each of the sections of the junction box receives one line, and electrically interconnects each wire in the section with all other wires in the section. For alternating current, there may be one section for the hot line, one section for the ground line, and another section for the additional ground wire now required. For direct current, there may be one section for the positive line and one section for the negative line. For three phase or other currents, the number of sections will of course be varied to provide one section for each line required. For convenience, this designation of sections for particular lines will be referred to as polarity, whether the current is alternating or direct.

In one embodiment of the invention, the junction box is made in stacked layers, with each layer comprising one section. Thus, the number of sections required can be provided simply by stacking a plurality of layers together.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing one form of junction box made in accordance with the present invention;

FIG. 2 is a diametrical cross-sectional view taken through the junction box of FIG. 1;

FIG. 3 is a view similar to FIG. 2, but showing a modified form of the invention;

FIG. 4 is an enlarged, fragmentary view showing a wire terminal for use with the present invention; and, FIG. 5 is an enlarged, fragmentary view illustrating a cable connection that may be used with the embodiment of the invention shown in FIG. 3.

DETAILED DESCRIPTION OF THE EMBODIMENTS

Referring now more particularly to the drawings, and to those embodiments of the invention here chosen by way of illustration, FIG. 1 shows a junction box generally designated at 10, and including three sections 11, 12 and 14. In this embodiment of the invention each section comprises a layer, so the two terms may be used interchangeably. It will be understood from the following discussion, however, that the sections may take other forms in other embodiments of the invention.

It will be noted that each of the layers 11, 12 and 14 is substantially identical, the layers being generally cylindrical in form, and defining an axial opening 15 therethrough. Around the outer periphery of each layer 11, 12 and 14 is a plurality of terminals. All of the terminals are alike, so all are designated as as 16. Adjacent to each terminal 16 is a release slot 18. Again, all the release slots are alike, so all are designated as 18. It is contemplated that each layer will be colored to indicate the polarity of the layer.

Looking briefly at FIG. 2 of the drawings, each of the layers 11, 12 and 14 includes upper and lower walls 19 and 20 respectively, and there is a common inner wall 21 defining the axial opening 15. As a result, the interior of each layer 11, 12 and 14 is open, and separated from all other layers. The junction box 10 is formed of an electrical insulating material, so each of the layers is electrically insulated from the other layers. The material is here indicated as a plastic, and it is preferred that the box 10 be formed of a thermoplastic so parts can be heat sealed or the like during manufacture and assembly.

The lower wall 21A of the box 10, as shown in FIG. 2, extends across the axial opening 15, and defines at least one mounting hole 22. A screw can be passed through the hole 22 to fix the junction box 10 to a convenient surface.

With the above description in mind, it should now be understood that the junction box 10 of the present invention will be mounted in a convenient location, preferably somewhat central for the circuits to be connected through the box. Each cable will then be brought to the box 10, and there is no question as to the polarity chosen for each layer because the layers will have the same colors as the wires to be attached to the layers.

One of the terminals 16 on each layer will receive the supply line for the circuit being connected, and the other terminals will receive branch circuits. As here shown, the box 10 is round, and there are eight terminals on each layer. Thus, seven branch circuits can very easily be connected without crowding, and without the use of multiple boxes with required interconnections. It will also be understood that the box 10 may have only two layers, or sections, and be used to connect a plurality of circuits to one switch. The cable from the switch will be received in one set of terminals 16, and the cables to the various branches will be received in the remaining terminals.

Attention is now directed to FIG. 3 of the drawings, which shows a modified form of the invention. The basic structure of the junction box is the same as shown in FIGS. 1 and 2, and common parts are designated by the primes of the same numerals. There are two differences between the embodiments of FIG. 1 and FIG. 3. FIG. 3 shows a cover over the box 10', and the box 10' is mounted by external tabs rather than by the central portion of the bottom wall.

The bottom wall of the lowest layer 14' is designated at 25. The wall is imperforate across the box 10', and includes a plurality of tabs 26 extending beyond the outer walls of the box 10'. Each of the tabs 26 defines a screw hole therethrough for mounting the box 10.

The upper wall of the uppermost layer 11' is designated at 28, and this wall extends completely across the box 10'. The center of the wall 28 includes a boss 29 which defines a threaded hole for receiving a screw 30. The screw 30 secures the cover 31 to the box 10'.

The cover 31 is generally cylindrical in shape, having a closed top 32 and an open bottom 34. Thus, the cover 31 can be placed over the box 10', and secured in place with the screw 30. The outer wall 35 of the cover 31 may define a plurality of slits 36 to receive the electrical cables connected to the box 10'. The slits 36 will of course be aligned with the various terminals 16 which are not illustrated in FIG. 3. Furthermore, it will be understood by those skilled in the art that the plurality of slits 36 may include a web that is easily broken out, so the electrician can provide only the slits actually needed for the particular installation.

The boxes shown in FIGS. 1-3 have connector strips which electrically connect all the terminals 16 in each layer. The connector strips are all alike, and are designated at 38 and 38'. FIG. 4 shows the construction of the connector strips and the terminals 16 and release slots 18. In FIG. 4, the numerals of FIG. 1 are used.

It is contemplated that the box 10 will be molded of a thermoplastic, and probably each layer will be molded separately, a plurality of layers being subsequently assembled. After the layer has been molded, a connector strip 38 will be inserted as shown. The connector strip 38 will be pre-punched, probably in flat strips, and will then be placed into the layer. To assure proper alignment of the strip, the layers 11, 12 and 14 have alignment tips 39 which are receivable through alignment holes 40 in the strip 38.

Looking at FIG. 4, the construction of the terminal 16 and release slot 18 will be understood. The terminal 16 includes a hole 41 through the outer wall of the box 10, the hole 41 being aligned with one end of an opening 42 in the connector strip 38. The opening 42 is elongated, and a finger 44 extends angularly over the opening 42. As a result, when a wire is urged through the hole 41, the wire will engage the finger 44 and have to urge the finger 44 out of the way in order for the wire to pass fully into the box 10. The material of the connector strip 38 has resilience, so the finger will be spring urged against the wire. Furthermore, because of the sharp corner 45, the wire will be held in the terminal 16. The connector strip 38 therefore both mechanically holds a wire, and electrically connects the wire to other wires also held by the connector strip.

If a wire in a terminal 16 must be removed, one can insert a tool through the release slot 18 and urge the finger 44 away from the wire. Once the corner 45 releases the wire, the wire can be easily removed.

It will be understood by those skilled in the art that the strip 38 can be made as thick as is required to carry the amount of current desired. Also, additional flanges or the like can be provided to increase the surface area of contact between the wire and the connector strip 38.

In the event the electrical cables need to be fixed with respect to the box 10, the cover as shown in FIG. 3 may be required. FIG. 5 of the drawings illustrates two securing means for use with the cover 31.

In FIG. 5, a box 10' is fixed to a surface 46, and a cover 31 is in place over the box 10'. One cable 48 is shown, the cable 48 having a plurality of individual wires 49 which re connected to the box 10'. To fix the cable 48 with respect to the box 10', it may be sufficient to place a staple 50 adjacent to the box 10'. Such staples are well known and are commonly used to hold cables in place. The staple will then prevent stress on the cable 48 from being carried solely by the connection of the wires 49 to the box 10'.

Another cable connector is also shown in FIG. 5. Again, it is well known to provide a collar such as the collar 50 for cables, the collar being either clamped by a screw or crimped onto the cable 48. The collar 50 then has flanges 51 extending therefrom, so the flanges 51 engage the cover 31. The collar 50 would therefore receive stress placed on the cable 48 and protect the wires 49.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. An electrical junction box, for receiving the ends of a plurality of electrical cables, each cable having a plurality of wires therein, each wire of said plurality of wires including an indication of polarity of said wire, said junction box providing for connection of wires of one cable to wires of another cable of said plurality of cables, said junction box comprising a plurality of sections including a first section and a second section, said first section including a first plurality of terminals, each terminal of said first plurality of terminals being electrically connected to one another and adapted to receive wires of one polarity, said second section including a second plurality of terminals electrically connected to one another and adapted to receive wires of a second polarity, each section of said plurality of sections comprising one layer of a plurality of horizontal layers, each layer of said plurality of layers being generally circular, said first plurality of terminals being substantially equally spaced around the periphery of said first layer, said second plurality of terminals being substantially equally spaced around the periphery of said second layer, each layer of said plurality of layers including upper and lower walls for electrically insulating adjacent layers from each other, said terminals being located between said upper walls and said lower walls, each terminal of said plurality of terminals including a hole defined in a layer, a connector strip within said layer, said connector strip defining a slit therein having one end aligned with said hole in said layer, and wire gripping means for gripping a wire passing through said hold and said slit.

2. An electrical junction box as claimed in claim 1, said wire gripping means including a finger carried by said connector strip and located for engaging a wire passing through said hole in said layer, and means for releasing said finger.

3. An electrical junction box as claimed in claim 2, said means for releasing said finger comprising a slot defined in said layer adjacent to said hole defined in said layer, and a tool passing through said slot and engaging said finger.

4. An electrical junction box as claimed in claim 1, wherein each layer of said plurality of layers in annular and defines a central opening, and means for fixing said junction box to a surface.

5. An electrical junction box as claimed in claim 4, and further including a cover receivable over said junction box, said cover including a top wall generally parallel to the upper wall of said junction box and a side wall perpendicular thereto, said side wall defining a plurality of slits therein for receiving said cables therethrough.

6. An electrical junction box as claimed in claim 5 and further including means for fixing said cover to said junction box.

7. An electrical junction box as claimed in claim 6, and including means for fixing said plurality of cables with respect to said junction box.

8. An electrical junction box as claimed in claim 6, and including a means for fixing said plurality of cables with respect to said cover.

* * * * *